United States Patent
Ashberry et al.

(10) Patent No.: US 12,247,295 B2
(45) Date of Patent: Mar. 11, 2025

(54) PLATINUM NANOPARTICLE DEPOSITION ON A SERIES OF UiO METAL-ORGANIC FRAMEWORKS

(71) Applicant: The Government of the United States of America, as represented by the Secretary of the Navy, Arlington, VA (US)

(72) Inventors: Hannah Marie Ashberry, Alexandria, VA (US); Albert Epshteyn, Potomac, MD (US); James A. Ridenour, Arlington, VA (US); William A. Maza, Silver Spring, MD (US); Olga Baturina, Burke, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 23 days.

(21) Appl. No.: 18/238,794

(22) Filed: Aug. 28, 2023

(65) Prior Publication Data
US 2024/0068106 A1 Feb. 29, 2024

Related U.S. Application Data

(60) Provisional application No. 63/374,131, filed on Aug. 31, 2022.

(51) Int. Cl.
*C23C 22/02* (2006.01)

(52) U.S. Cl.
CPC .................................. *C23C 22/02* (2013.01)

(58) Field of Classification Search
CPC ...................................................... C23C 22/02
See application file for complete search history.

(56) References Cited

U.S. PATENT DOCUMENTS

| | | | | |
|---|---|---|---|---|
| 10,953,393 | B2 * | 3/2021 | Lin | C07F 9/5059 |
| 2005/0235869 | A1 * | 10/2005 | Cruchon-Dupeyrat | C23C 18/06 |
| | | | | 106/31.29 |
| 2010/0019196 | A1 * | 1/2010 | Yang | C01B 3/001 |
| | | | | 204/164 |
| 2010/0167078 | A1 * | 7/2010 | Kim | B22F 1/054 |
| | | | | 420/466 |
| 2013/0053239 | A1 * | 2/2013 | Carpenter | H01M 4/925 |
| | | | | 977/773 |
| 2020/0001245 | A1 | 1/2020 | Karnik et al. | |
| 2021/0138433 | A1 * | 5/2021 | Usman | B01D 53/04 |
| 2022/0258232 | A1 * | 8/2022 | Ling | B22F 7/04 |

OTHER PUBLICATIONS

Xiao, Juan-Ding, et al., "Boosting Photocatalytic Hydrogen Production of a Metal-Organic Framework Decorated with Platinum Nanoparticles: The Platinum Location Matters". Angewandte Chemie, Int. Ed. 2016, 55, 9389-9393.*
Wang, Kaixuan, et al., "In Situ One-Step Synthesis of Platinum Nanoparticles Supported on Metal-Organic Frameworks as an Effective and Stable Catalyst for Selective Hydrogenation of 5 Hydroxymethylfurfural". ACS Omega 2020, 5, 16183-16188.*
Saeb, Elhameh, et al., "Enhanced electrocatalytic reduction activity of Fe—MOF/Pt nanoparticles as a sensitive sensor for ultra-trace determination of Tinidazole". Microchemical Journal, 172 (2022) 106976, pp. 1-9.*
Ling, Pinghua, et al., "Platinum nanoparticles encapsulated metalorganic frameworks for the electrochemical detection of telomerase activity". Chem. Commun., 2016, 52, 1226-1229.*
Chen, Season S, et al., "De Novo synthesis of platinum-nanoparticle-encapsulated UiO-66-NH2 for photocatalytic thin film fabrication with enhanced performance of phenol degradation". Journal of Hazardous Materials, 397 (2020) 122431, pp. 1-10.*
Muhamed, Shamna, et al., "Exploring the Defect Sites in UiO-66 by Decorating Platinum Nanoparticles for an Efficient Hydrogen Evolution Reaction". Inorg. Chem. 2022, 61, 13271-13275. (published Aug. 16, 2022).*
Winarta, Joseph, et al., "A Decade of UiO-66 Research: A Historic Review of Dynamic Structure, Synthesis Mechanisms, and Characterization Techniques of an Archetypal Metal-Organic Framework". Crystal Growth & Design, 2020, 20, 1347-1362.*
Gan et al., "Element-specific anisotropic growth of shaped platinum alloy nanocrystals" Science, 2014, 346, 6216, 1502-1506.
Winarta et al., "A Decade of UiO-66 Research: A Historic Review of Dynamic Structure, Synthesis Mechanisms, and Characterization Techniques of an Archetypal Metal-Organic Framework" Cryst. Growth Des. 2020, 20, 1347-1362.
He, J., et al. Chem. Commun., 2014, 50, 7063.
Zhang, W., et al. Adv. Mater., 2014, 26, 4056-4060.
Ye, H., et al. ACS Appl. Nano Mater. 2020, 3, 12260-12268.

* cited by examiner

*Primary Examiner* — Bret P Chen
(74) *Attorney, Agent, or Firm* — US Naval Research Laboratory; Roy Roberts

(57) ABSTRACT

Deposition of Pt nanoparticles on UiO metal organic frameworks via solvothermal reduction is achieved by reducing Pt acetylacetonate ($Pt(acac)_2$) in a UiO-66 and N,N-dimethylformamide (DMF) mixture at, for example, 130° C. for 18 hrs. Modification of reaction temperature and time can control the size of the Pt nanoparticles.

7 Claims, 1 Drawing Sheet

PLATINUM NANOPARTICLE DEPOSITION ON A SERIES OF UiO METAL-ORGANIC FRAMEWORKS

CROSS-REFERENCE TO RELATED APPLICATIONS

This application claims the benefit of U.S. Provisional Application 63/374,131 filed on Aug. 31, 2022, the entirety of which is incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing NC 211205.

BACKGROUND

Metal organic frameworks (MOFs) are a class of materials that have very high surface areas and have the potential to be engineered into multifunctional electrocatalytic composites. Integration of MOFs with inorganic NPs, such as Pt, is an efficient method to obtain enhanced electrochemical performance.

Various routes have been developed to deposit Pt NPs onto a variety of MOFs, such as solution impregnation (He, J., et al. Chem. Commun., 2014, 50, 7063), deposition of pre-synthesized Pt NPs (Zhang, W, et al. Adv. Mater., 2014, 26, 4056-4060), or solvothermal syntheses (Ye, H., et al. ACS Appl. Nano Mater. 2020, 3, 12260-12268). However, these routes towards deposition often occur in multiple steps, which is not desirable for efficiency or scale-up of processes. In addition, previously demonstrated routes towards Pt NP deposition have limited control of various parameters, such as NP size, Pt wt % loading, and dispersity on the MOF. Synthetic control of these parameters is imperative to developing new MOF composites with enhanced electrochemical activity and stability.

A need exists for new techniques for the deposition of Pt nanoparticle (NPs) onto MOFs.

BRIEF SUMMARY

In one embodiment, a method of depositing platinum nanoparticles onto a metal organic framework (MOF) includes providing a MOF in N,N-dimethylformamide (DMF); and contacting the MOF with platinum acetylacetonate at a temperature between 100° C. and 180° C., thereby depositing platinum nanoparticles onto the MOF.

DETAILED DESCRIPTION

Definitions

Figure 1A:
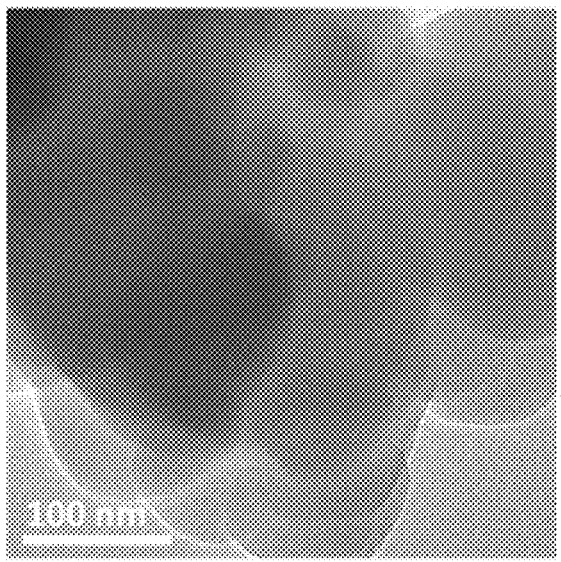
FIGS. 1A-1D show transmission electron microscopy images demonstrating size control of Pt nanoparticles with modification of time and temperature of the reaction.
Figure 1B:
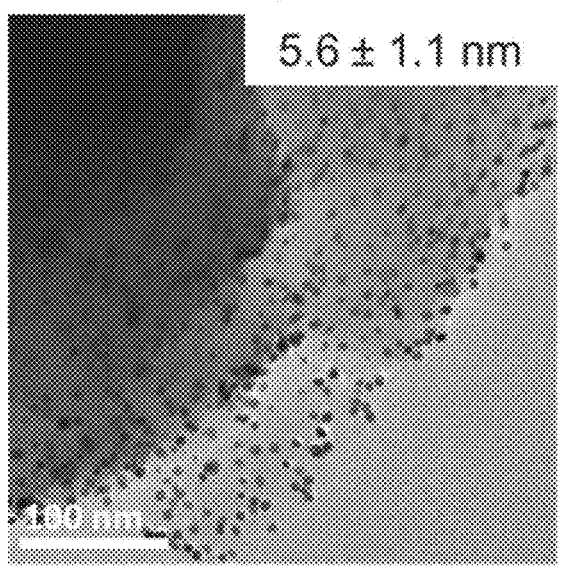
Figure 1C:
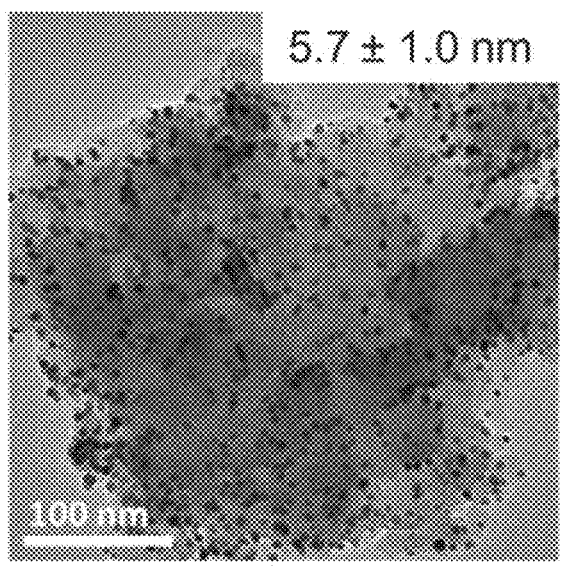
Figure 1D:
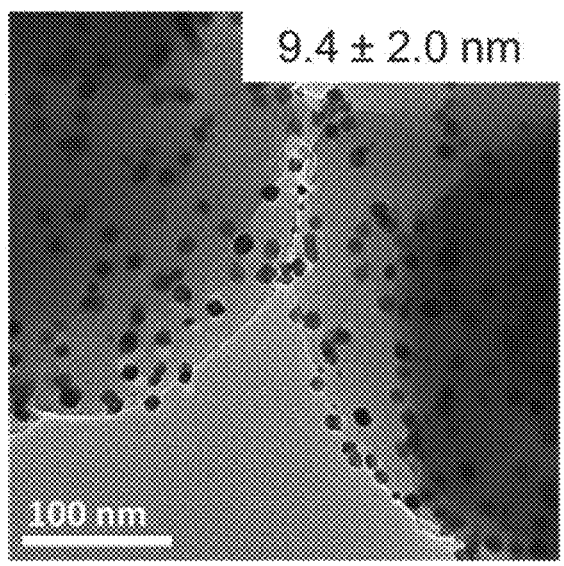

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

Overview

Described herein is a route towards Pt NP deposition onto UiO MOFs that is one-step and demonstrates control of size, wt % loading of Pt, and dispersity on the MOF. The UiO/Pt NP MOF composites generated from this method can be used in electrochemical applications to achieve enhanced activity and stability.

The exemplary MOF used herein is UiO-66, which is composed of a zirconium oxide complex bridged by terepthalic acid ligands. It is easy to synthesize, stable in various conditions, and has a pore size amenable to modification with different organic ligands.

The deposition of Pt nanoparticles on UiO MOFs via solvothermal reduction is achieved by reducing Pt acetylacetonate ($Pt(acac)_2$) in a UiO-66 and N,N-dimethylformamide (DMF) mixture at, for example, 130° C. for 18 hrs. Modification of reaction temperature and time can control the size of the Pt nanoparticles. The synthetic procedure is described below.

Example 50 mg of UiO-66 was dispersed in 10 mL of DMF in a 50 mL screw-top round bottom flask and the mixture was sonicated for 20 mins. 11.9 mg of $Pt(acac)_2$ (for 12 wt % loading of Pt) was dissolved in 4 mL of DMF. After sonication of the UiO-66/DMF mixture, the round bottom flask was heated at 130° C. in an oil bath with stirring. Then the Pt/DMF solution was added dropwise to UiO-66/DMF mixture. The mixture was stirred for 18 hrs at 130° C. The light gray precipitate was collected by centrifugation followed by washing three times with ethanol. Then the precipitate was dried overnight in a vacuum oven at 80° C. Transmission electron microscopy (TEM) revealed well-dispersed spherical Pt NPs with an average diameter of 5.6±1.1 nm were achieved.

Further Embodiments

The wt % loading of Pt may be modified by altering the amount of Pt(acac) 2 added to the UiO-66/DMF mixture. This can achieve varying Pt wt % loading on the MOF to enhance the electrochemical activity of the MOF composite.

Reactions may be performed at various temperatures and lengths of time. The modification of these parameters leads to tuning of the size of the nanoparticles. Higher temperature (140° C.) for a shorter time (4 hrs) leads to larger Pt NPs (9.4±2.0 nm). Shortening the time at 130° C. leads to smaller nanoparticles.

This technique can be applied to variety of substrate materials, including MOFs, MOF-derived pyrolyzed powders, and other substrates of interest.

Other UiO MOFs can be used, such as UiO-67 and UiO-68, which are achieved by changing the organic linkers of the MOF. UiO-67 and UiO-68 have larger pore sizes, which can allow for more Pt NPs to be potentially deposited in the interior of the MOF. Pt NP deposition can occur on other UiO-66 MOF derivatives (UiO-66-$NH_2$, UiO-66-Cl, and UiO-66-Ac). Amino acid functionalized UiO-66 can serve as an anchoring agent for Pt ions, leading to well-dispersed Pt nanoparticle formation on the MOF. In addition, other types of MOFs may be used for Pt nanoparticle deposition, such as MIL and ZIF based MOFs. Other compositions of NPs may also be deposited onto UiO MOFs, such as Pt alloys and other noble metals, like Pd. The selected metal precursors would need to be soluble in DMF, since it serves as the main reducing agent to achieve nanoparticles Advantages Described herein is a new route towards depositing Pt NPs in one-step with pre-synthesized UiO MOFs. Previously, Pt NPs were deposited onto UiO-66 in multiple steps. In previously demonstrated routes in literature, Pt NPs are pre-synthesized and deposited, limiting the amount of Pt NPs deposited inside of the MOF. Alternatively, Pt ions are deposited and must be reduced by reducing agents, $H_2$ gas, or pyrolysis to achieve NPs. In contrast, the route described here reduces the Pt metal precursor and deposits NPs in one step in solution. In addition to the ease of the synthetic process, the deposition method allows for control of the size of the NP and wt % loading of Pt, which can be modified by altering the temperature and time of the reaction. The other deposition routes in literature do not demonstrate control of these parameters and often have low Pt loading on the MOF, which is not ideal for electrocatalytic applications. The development of this route towards Pt NP deposition onto UiO MOFs marks a significant advancement in the development of MOF composites for electrochemical applications.

CONCLUDING REMARKS

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention.

What is claimed is:

1. A method of depositing platinum nanoparticles onto a metal organic framework (MOF), the method comprising:
   providing a MOF in N,N-dimethylformamide (DMF); and
   contacting the MOF with platinum acetylacetonate at a temperature between 100° C. and 180° C., thereby depositing platinum nanoparticles onto the MOF.

2. The method of claim 1, wherein said MOF is UiO-66.

3. The method of claim 1, wherein said temperature is between 120° C. and 150° C.

4. The method of claim 1, wherein said depositing is accomplished as a single reaction to produce said platinum nanoparticles deposited onto the MOF without a need for additional steps.

5. A method of depositing platinum nanoparticles onto a metal organic framework (MOF), the method consisting essentially of:
   providing a MOF in N,N-dimethylformamide (DMF); and
   contacting the MOF with platinum acetylacetonate at a temperature between 100° C. and 180° C., thereby depositing platinum nanoparticles onto the MOF.

6. The method of claim 4, wherein said MOF is UiO-66.

7. The method of claim 4, wherein said temperature is between 120° C. and 150° C.

* * * * *